United States Patent
Kotlarski et al.

(10) Patent No.: US 7,559,110 B1
(45) Date of Patent: Jul. 14, 2009

(54) WIPER BLADE FOR CLEANING VEHICLE PANES AND METHOD FOR MOUNTING SAID WIPER BLADE

(75) Inventors: Thomas Kotlarski, Bad Neuenahr (DE); Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,447

(22) PCT Filed: Nov. 9, 1999

(86) PCT No.: PCT/DE99/03565

§ 371 (c)(1),
(2), (4) Date: Dec. 26, 2000

(87) PCT Pub. No.: WO00/53470

PCT Pub. Date: Sep. 14, 2000

(30) Foreign Application Priority Data

Mar. 6, 1999 (DE) ................................ 199 09 971

(51) Int. Cl.
*B60S 1/38* (2006.01)
*B60S 1/40* (2006.01)

(52) U.S. Cl. .............. 15/250.43; 15/250.32; 15/250.451

(58) Field of Classification Search .............. 15/250.43, 15/250.44, 250.451, 250.361, 250.452, 250.48
See application file for complete search history.

(56) References Cited

U.S. PATENT DOCUMENTS 3,035,298 A * 5/1962 Scinta .................... 15/250.452

(Continued)

FOREIGN PATENT DOCUMENTS

DE 1 505 357 5/1969

(Continued)

OTHER PUBLICATIONS

Translation of German patent 19627115. Translated Feb. 2006 by Schreiber Translations, Inc.*

*Primary Examiner*—Gary K Graham
(74) *Attorney, Agent, or Firm*—Michael J. Striker

(57) ABSTRACT

A wiper blade is suggested for cleaning window panes in motor vehicles. The wiper blade (10) has an elongated rubber-elastic wiping strip (20) which can contact the window pane (18) and is provided at both of its longitudinal sides (30) with open-edged longitudinal receiving grooves which are arranged in a plane approximately parallel to the window pane and in which a strip-like, elongated, resilient carrying rail (12) is accommodated in each instance. The inner edges of the carrying rail (12) which face one another contact a longitudinal web (36) of the wiping strip remaining between the grooves (32) and the two carrying rails (12) are secured in their receiving grooves transverse to their longitudinal extension by a holder which is arranged at the upper strip surface (13) of the carrying rails remote of the window pane. The holder is provided with L-shaped claws (46), the first L-leg (48) traversing the outer edges (52) of the carrying rails and the second L-leg (50) engaging under the respective carrying rail (12). A wiper blade (10) which can be mounted in a particularly advantageous manner is provided when the distance (60) measured transverse to the longitudinal extension of the wiper blade (10) between the inner edges of the first L-leg (48) which face one another is less than the sum of the width (62) of the two carrying rails (12) plus the width (46) of the longitudinal web (36) of the wiping strip (20).

2 Claims, 2 Drawing Sheets

U.S. PATENT DOCUMENTS 3,386,123 A * 6/1968 Oishei et al. ............ 15/250.452
3,659,310 A * 5/1972 Rosen ................... 15/250.452
4,796,326 A * 1/1989 Beneteau et al. ....... 15/250.452
5,598,603 A * 2/1997 Mege et al. ............ 15/250.454
5,697,156 A * 12/1997 Buechele .................. 29/897.2
5,713,100 A * 2/1998 Samartgis .............. 15/250.452
6,185,805 B1 * 2/2001 Rosiere et al. ................ 29/428

FOREIGN PATENT DOCUMENTS

| | | | |
|---|---|---|---|
| DE | 3208749 | * 10/1982 | ............ 15/250.453 |
| DE | 196 27 115 A | 1/1998 | |
| EP | 0 783 998 A | 7/1997 | |
| GB | 2 191 083 A | 12/1987 | |

* cited by examiner

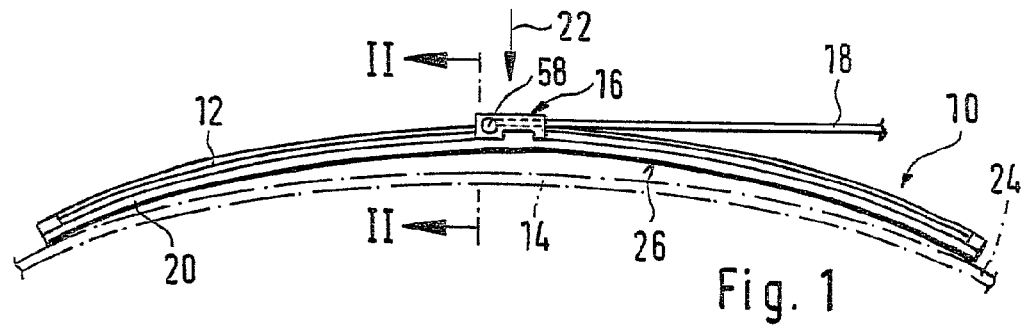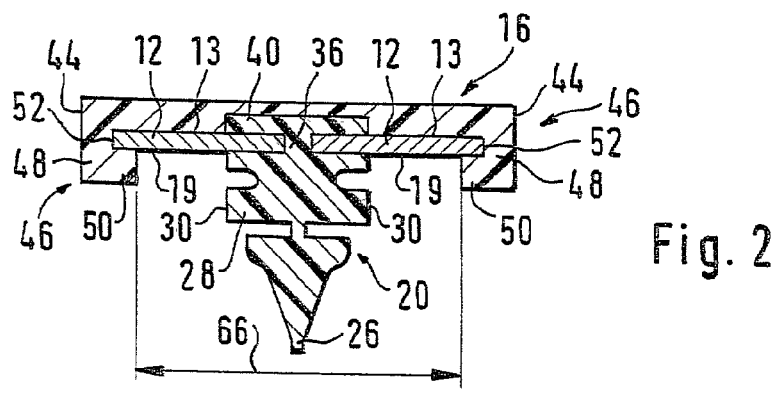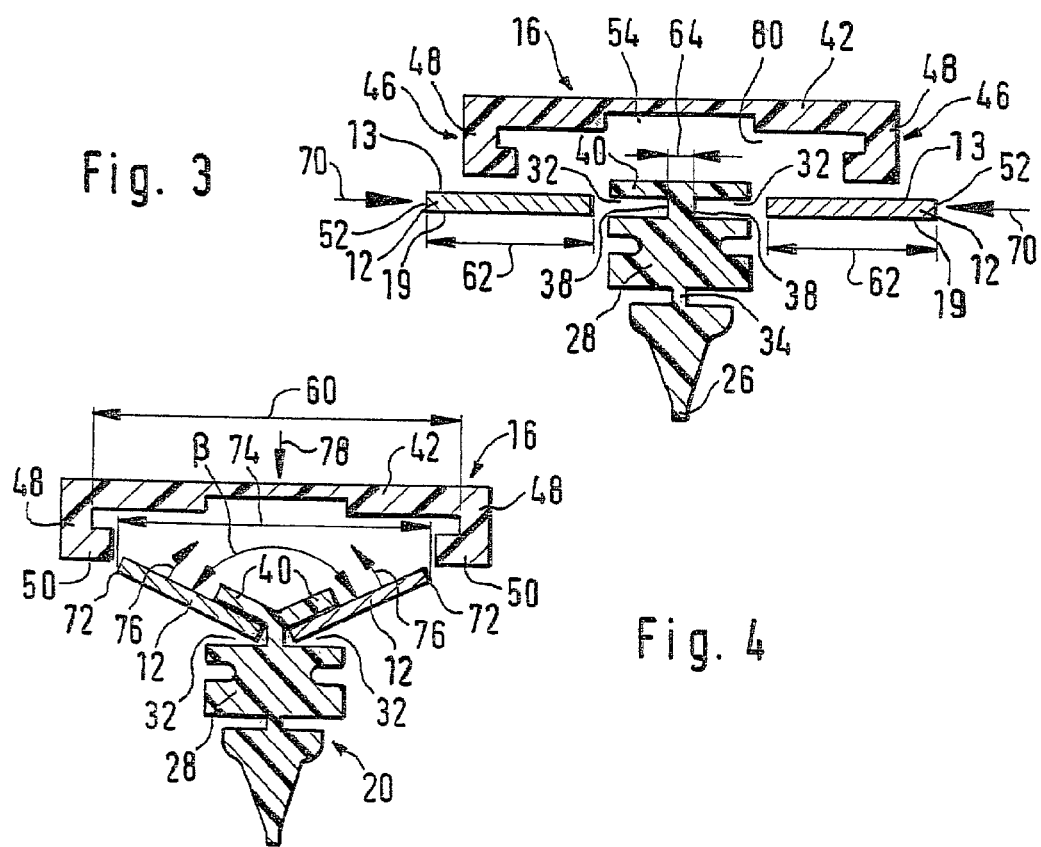

WIPER BLADE FOR CLEANING VEHICLE PANES AND METHOD FOR MOUNTING SAID WIPER BLADE

BACKGROUND OF THE INVENTION

In wiper blades, the mounting rails or carrying rails should ensure that the wiper blade contact pressure proceeding from the wiper arm is distributed as uniformly as possible at the window pane over the entire wiping field to be wiped by the wiper blade. Due to a corresponding curvature of the carrying rails when not loaded, that is, when the wiper blade does not contact the window pane, the ends of the wiper blade which rest entirely upon the window pane when the wiper blade is operating are loaded toward the window pane by the carrying rails which are tensioned in operation, even when the radii of curvature of spherically curved vehicle window panes change in every position of the wiper blade. The curvature of the wiper blade must accordingly be somewhat greater than the greatest curvature measured in the wiping field at the window pane to be wiped. Thus, the carrying rails replace the costly carrying clip construction having two spring rails arranged in the wiping strip that was used in conventional wiper blades (DE-OS 15 05 357).

The invention is based on a wiper blade according to the preamble of claim 1. In a known wiper blade of this type (DE 19 62 71 15.0 A1), the holder which is produced from sheet metal is furnished with bending tabs which are provided for forming claws and which are bent inward after placing the holder on the upper strip surfaces of the carrying rails, so that their ends grip their respective carrying rail. When the wiping strip is worn out, the entire wiper blade must be replaced even if the carrying rails and the holder are still intact. As concerns the operating safety of the wiper blade, this means that the bending tabs may not be bent back and then bent inward again after exchanging the used wiping strip.

SUMMARY OF THE INVENTION

In the wiper blade according to the invention, when the wiping strip which is provided with the carrying rails is inserted into the holder it is held by the tension which is generated in the longitudinal crosspiece or longitudinal web and which is formed by the difference in amount between the distance of the first L-legs from one another and the summed amount when the longitudinal web is compressed. This makes it possible to remove the wiping strip from the holder opposite the mounting direction by elastic deformation of the upper walls of the receiving grooves without deformation of the claws. The carrying rails and holder remain fully functional and can therefore continue to be used without restrictions.

Cutouts in the wiping strip which are adapted to the claws of the holder can be dispensed with when each of the two carrying rails projects out of its receiving grooves at least along a longitudinal portion by an edge strip and the second L-legs engage the lower strip surface of their carrying rails which faces the window pane.

A simple, economical construction of the holder is achieved in that the holder has a plate-like body which is supported at the upper strip surfaces of the carrying rails, the first L-legs of the claws being connected with longitudinal sides of this plate-like body that are located opposite one another.

In order to fasten the holder to the carrying rails firmly and so as to operate in reliable fashion, the claws are arranged at the longitudinal sides by pairs located opposite one another.

When the body of the holder is provided at its underside facing the upper strip surfaces of the two carrying rails with a longitudinal cutout for receiving a cover strip of the wiping strip defining the width of the two receiving grooves, the overall height of the wiper blade is reduced, which offers advantages in wiping operation.

In a further development of the inventive idea, the holder is provided with means for connecting the wiper arm.

The holder is fitted to the wiping strip provided with the carrying rails so as to operate in a particularly reliable manner in that the lower strip surfaces of the two carrying rails together enclose an angle that is less than 180°.

Depending on the specific requirements for the holder, the latter can advantageously be made of plastic or metal.

In order for the interlocking connection comprising the two carrying rails and the wiping strip to be properly fixed in the longitudinal direction of the wiper blade with a contact pressing pressure that avoids wear on material, even with increasing age of the wiping strip, each carrying rail is provided with at least one projection at its inner longitudinal edges facing the longitudinal web of the wiping strip.

Depending on specific requirements for the wiper blade, it can be advantageous when the projection of one carrying rail lies over the projection of the other carrying rail or when the projection of one carrying rail is arranged so as to be offset with respect to the projection of the other carrying rail in its longitudinal direction.

In certain cases of application, it can also be advantageous when a recess of one carrying rail is located opposite to the projection of the other carrying rail.

The wiper blade enables a particularly advantageous method for mounting the wiper blade in which, in a first method step, the carrying rails are introduced into their receiving grooves and their upper strip surfaces are tilted relative to one another in such a way that, together, they enclose an angle of less than 180° and that the carrying rails are then inserted together with the wiping strip into the space between the claws arranged at the oppositely located longitudinal sides of the holder, in which space the carrying rails, when released, automatically attain their operating position and are fixed in the holder together with the wiping strip by the resulting tension of the longitudinal web. The mounting method according to the invention is characterized by a series of simple, linear mounting movements, so that it is particularly amendable to automation.

Further advantageous developments and constructions of the invention are indicated in the following description of an embodiment example shown in the accompanying drawings.

DESCRIPTION OF THE DRAWINGS

FIG. 1 shows a side view of a wiper blade which is connected to a wiper arm and which contacts the window pane to be wiped by the ends of its wiping strip;

FIG. 2 shows an enlarged view of the sectional surface of a section through the wiper blade along line II-II in FIG. 1;

FIG. 3 shows the individual parts of the wiper blade corresponding to FIG. 2 prior to mounting;

FIG. 4 shows the arrangement according to FIG. 3 with partially mounted individual parts;

DESCRIPTION OF THE PREFERRED EMBODIMENTS

Figure 5:
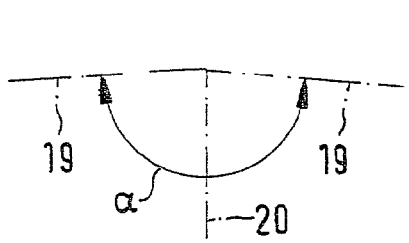
FIG. 5 shows a schematic view of the arrangement according to FIG. 2, but with a modified position of the carrying rails.

A wiper blade 10 shown in FIGS. 1 to 4 has an elongated, resilient carrying element having two carrying rails 12. A connection device 16 is arranged at the upper side remote of the window pane 14 to be wiped, shown in dash-dot lines in FIG. 1, or at the upper strip surface 13 of the carrying rails 12 (FIGS. 1 and 2). The wiper blade 10 can be detachably connected with a driven wiper arm 18 (FIG. 1) by means of this connection device 16. An elongated, rubber-elastic wiping strip 20 is arranged parallel to the longitudinal axis at the underside facing the window pane 14 or at the lower strip surface 19 of the carrying rails 12. The wiper arm 18 is loaded in the direction of arrow 22 toward the window pane 14 to be wiped; the surface of this window pane 14 to be wiped has been designated by reference number 24 in FIG. 1. Since the dash-dot line 24 represents the greatest curvature of the window pane surface, it is clear that the curvature of the wiper blade 10 which initially contacts the window pane only by its two ends is greater than the maximum curvature of the window pane. Under contact pressing pressure (arrow 22), the wiper lip 26 of the wiper blade contacts the window pane surface 24 over its entire length. In so doing, a tension is built up in the strip-like, resilient carrying element and in the two carrying rails 12, this tension providing for proper contact of the wiping strip 20 and its wiping lip 26 at the motor vehicle window pane 14 over the entire length.

The special construction of the wiper blade 10 according to the invention will be explained in more detail in the following.

It can be seen from the cross-section through the wiper blade shown in FIG. 2 that the wiping strip 20 has a base part 28 which is block-shaped in cross section and which accommodates the two carrying rails 12 of the wiping strip 28. In addition, an open-edge longitudinal groove 32 (FIG. 3) is provided in each of the two longitudinal sides 30 of the base part, wherein one of the two carrying rails 12 fits in each of the two longitudinal grooves. At the side of the base part 28 remote of the connection device 16 serving as holder for the carrying rails 12, this base part 28 passes into a tilting web 34, as it is called, at which the wiping lip 26 is arranged. A longitudinal web 36 remains between the two longitudinal grooves 32 which are arranged in a common plane, the groove base 38 of the longitudinal grooves 32 being formed at the longitudinal web 36. The two longitudinal grooves 32 are defined at the side remote of the wiper lip 26 by a residual cover strip 40 of the base part 28. The holder 16 has an essentially plate-like body 42 supported at the upper strip surfaces 13, L-shaped claws 46 being arranged at the longitudinal sides 44 of this body 42 (particularly FIG. 3). The claws 46 are connected integral with the body 42 of the holder 16 via one L-leg 48. The other L-leg 50 is arranged at the free end of L-leg 48 remote of the body 42 at a distance from the body 42, wherein these other L-legs extend toward one another. As can be seen especially clearly from FIG. 2, the one L-leg 48 of the holder 16 crosses the outer edges 52 of the carrying rails 12, so that the other L-legs 50 of the claws 46 engage under the respective carrying rail 12. In this respect, it is not absolutely necessary that the other L-legs 50 fit closely around the carrying rails 12. Rather, it may be advantageous to allow the carrying rails 12 a certain play between the facing surfaces of the body 42 and the other L-legs 50. The predetermined curvature of the carrying rails 12 which is shown in FIG. 1 nevertheless causes the holder to be fixed relative to the carrying rails 12, which is necessary for mounting the wiper blade. On the other hand, a certain play of the carrying rails 12 in the holder 16 prevents a desired stiffening of the wiper blade 10 in its middle portion. At the underside of the holder body 42 facing the upper strip surfaces 13 of the carrying rails 12, the holder body 42 is provided with a groove-like longitudinal cutout 54 which serves to receive the cover strip 40 of the wiping strip 20.

Figure 6:
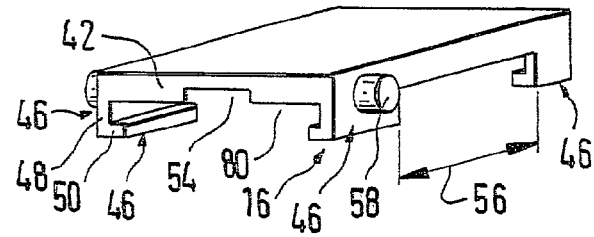
FIG. 6 shows a perspective view of the holder, not to scale.

FIG. 6 shows that the holder 16 is provided with claws 46 which are located opposite one another and are arranged in pairs. The claws on the same longitudinal side of the holder are arranged at a distance 56 from one another. However, it is also possible to provide only one individual claw on each longitudinal side of the holder 16, which individual claw can extend over the entire longitudinal side. In order to simplify the construction of the wiper blade, the holder 16 can take over the function of a device for connecting the wiper blade 10 to the wiper arm 18. One of the many different constructions of a connection device 16 of this kind is represented in FIGS. 1 and 6 by articulated pins 58 which are arranged at the longitudinal sides 44 of the holder; corresponding complementary articulated pins of the wiper arm 18 engage at these articulated pins 58.

The inner sides of the one L-leg 48 which face one another are arranged at a distance 60 from one another as measured traverse to the longitudinal extension of the wiper blade (FIG. 4). FIG. 2 shows that the two carrying rails 12 project out of their respective longitudinal grooves 32 of the wiping strip 20 at least in their middle portion because their width 62 (FIG. 3)—at least in the middle portion—is greater than the depth of the longitudinal grooves 32. It should be noted in addition that the groove base 38 of one longitudinal groove 32 is located at a distance 64 from the other groove base 38 of the other longitudinal groove 32. The distance 60 is adapted to the respective width 62 of the two carrying rails 12 plus the distance 64 between the two groove base surfaces 38 in such a way that the sum is greater than the distance 60. Accordingly, the carrying rails 12 are secured in their receiving grooves 32 transverse to the longitudinal extension of the wiper blade.

Figure 7:
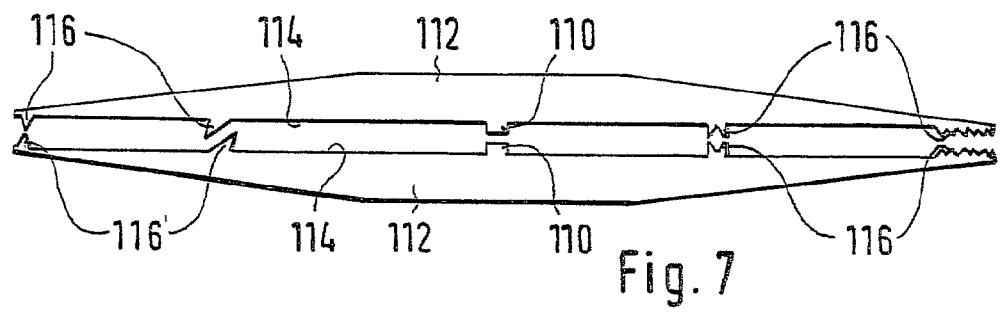
FIGS. 7 to 9 show different constructions of the carrying rails associated with the wiper blade.
Figure 8:
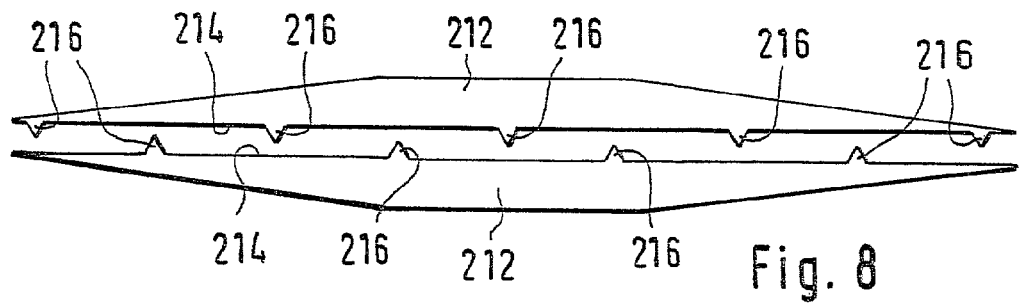
Figure 9:
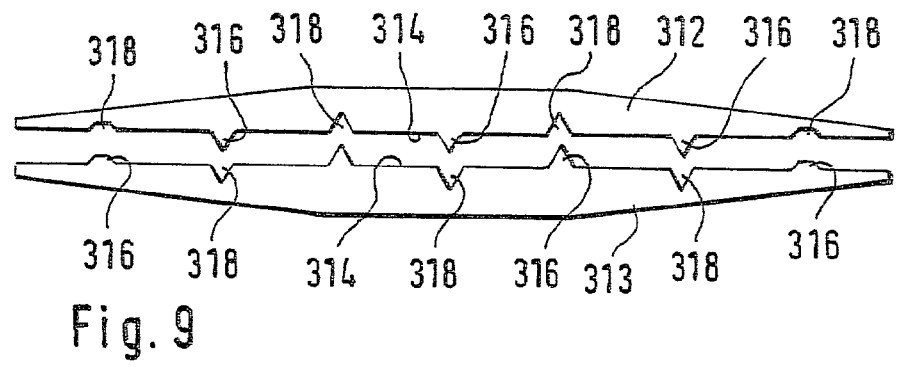

FIGS. 7 to 9 show advantageous constructions of the inner longitudinal edges of the carrying rails facing the groove base 38. The carrying rails are provided with projections for fixing the carrying rails relative to the wiping strip 20 in their longitudinal direction, these projections being arranged at the inner longitudinal edges 114 of the carrying rails 12 in FIG. 7. The projections 116 themselves can have different shapes as can be seen from FIG. 7 and are arranged in such a way that the projections of one carrying rail 114 are located across from the projections 116 of the other carrying rail 114.

Another arrangement of the projections 216 arranged at the inner longitudinal edges 214 of the carrying rails 212 is shown in FIG. 8. In this case, the projections 216 of one carrying rail 212 are arranged so as to be offset relative to the projections 216 of the other carrying rail 212 in the longitudinal direction of the latter.

Further, another possible construction according to FIG. 9 consists in that recesses 318 of carrying rails 313 are located across from projections 316 arranged at the inner longitudinal edges 314 of carrying rails 312. Of course, it is also possible to vary the shapes of the projections 316 and recesses 318 in a corresponding manner.

When mounting the wiper blade, it must be taken into account in particular that the distance 66 between the surfaces of the L-legs 50 of the claws 46 facing one another is less than the sum of the two widths 62 of the carrying rails 12 and the distance 64 between the base surfaces 38 of the two longitudinal grooves 32. Therefore, in a first mounting step or method step, the two carrying rails 12 must be introduced into their longitudinal grooves 32 in the direction of the two arrows 70 (FIG. 3). The two carrying rails 12 are then tilted in their receiving grooves 32 relative to one another in such a way that their upper sides or their upper strip surfaces 13 enclose an angle β with one another that is less than 180° until their outer edges are located at a distance 74 from one another that is less than the distance 66 between the two other L-legs 50 of the claws 46 (FIGS. 2 and 4). This tilting or adjusting movement in the direction of the two arrows 76 is possible because the wiping strip 20 and accordingly also the cover strip 40 is formed of a rubber-elastic material. When the wiper blade 12, 12, 20 has reached the intermediate mounting position shown in FIG. 4, the holder 16 can be arranged on the wiper blade in the direction of mounting arrow 78, wherein this wiper blade arrives in a space 80 which is partially enclosed by the body 42 and the claws 46 of the holder. The wiper blade 12, 12, 20 is then released so that the carrying rails 12 enter the claws 46 and attain their prescribed operating position (FIG. 2). Due to the above-mentioned difference between the distance 60 and sum 62, 62, 64, the longitudinal web 36 is elastically deformed and the tension generated in this way presses the carrying rails 12 by their outer edges 52 against the inner sides of one L-leg 48. This tension provides for proper fixing of the wiper blade in the holder 16. Under this tension, the projections 116 and 216 and 316, respectively, press into the longitudinal web 36 of the wiping strip 20 and provide for a reliable fixing of the carrying rails 19 in their longitudinal grooves 32. In the construction of the carrying rails 312 according to FIG. 9, the projections 316 press the material of the longitudinal web 36 into the recesses 318 of the other carrying rail 312. It is clear that the construction of the holder 16 must be designed in such a way that the holding tension proceeding from the longitudinal web 36 is absorbed by the holder without disadvantageous deformation of the claws 46 and/or of the base part 28. This applies also to the corresponding selection of material, for example, the use of a metal or a plastic.

With respect to a particularly stable holding of the wiper blade in the holder 16, it may also be advantageous when the holder and wiper blade are adapted in such a way that the lower strip surfaces 19 together enclose an angle α which is less than 180°. The principle of this construction is shown in FIG. 5, wherein the undersides 19 of the two carrying rails 12 and the wiping strip 20 are shown as dash-dot lines.

The invention claimed is:

1. Wiper blade for window panes in motor vehicles, comprising an elongated rubber-elastic wiping strip (20) which can contact the window pane (14) and is provided at both of its longitudinal sides (30) with open-edged longitudinal receiving grooves (32) which are arranged in a plane approximately parallel to the window pane and forming a longitudinal web (36) therebetween; a carrying element formed by at least two strip-shaped elongated, resilient separate carrying rails (12) accommodated in the grooves (32), the inner edges of the carrying rails (12) which face one another contact the longitudinal web (36) of the wiping strip (20) and the two carrying rails (12) are secured in the grooves (32) transverse to their longitudinal extension; a connection device formed as a holder (16) which secures the carrying rails (12) in the grooves (32) and is provided with means for connection of a wiper arm, wherein the holder is provided with L-shaped claws (46) each having two legs with a first L-leg (48) traversing outer edges (52) of the carrying rails and a second L-leg (50) engaging under the respective carrying rail (12), and a distance (60) measured transverse to the longitudinal extension of the wiper blade (10) between inner edges of the first L-leg (48) which face one another at least in a region of the L-legs is less than a sum of a width (62) of the two carrying rails (12) plus a width (46) of the longitudinal web (36) of the wiping strip (20), whereby the wiping strip (20) provided with the carrying rails (12) is held by compression produced in the longitudinal web (36), wherein said carrying element has a lower side on which the wiping strip (20) is directly placed and an upper side on which said connection device is directly place, wherein the lower strip surfaces (19) of the two carrying rails (12) together enclose an angle (α) that is less than 180°.

2. A method for mounting a wiper blade, comprising an elongated rubber-elastic wiping strip (20) which can contact the window pane (14) and is provided at both of its longitudinal sides (30) with open-edged longitudinal receiving grooves (32) which are arranged in a plane approximately parallel to the window pane and forming a longitudinal web (36) therebetween; a carrying element formed by at least two strip-shaped elongated, resilient separate carrying rails (12) accommodated in the grooves (32), the inner edges of the carrying rails (12) which face one another contact the longitudinal web (36) of the wiping strip (20) and the two carrying rails (12) are secured in the grooves (32) transverse to their longitudinal extension, a connection device formed as a holder (16) which secures the carrying rails (12) in the grooves (32) and is provided with means for connection of a wiper arm, wherein the holder is provided with L-shaped claws (46) each having two legs with a first L-leg (48) traversing outer edges (52) of the carrying rails and a second L-leg (50) engaging under the respective carrying rail (12) and a distance (60) measured transverse to the longitudinal extension of the wiper blade (10) between inner edges of the first L-leg (48) which face one another at least in a region of the L-legs is less than a sum of a width (62) of the two carrying rails (12) plus a width (46) of the longitudinal web (36) of the wiping strip (20), whereby the wiping strip (20) provided with the carrying rails (12) is held by compression produced in the longitudinal web (36), wherein said carrying element has a lower side on which the wiping strip (20) is directly placed and an upper side on which said connection device is directly placed, wherein the carrying rails (12) are introduced into their receiving grooves (32) and their upper strip surfaces (13) are tilted relative to one another in such a way that, together, they enclose an angle (β) of less than 180°, and the carrying rails (12) are then inserted together with the wiping strip (20) into the existing space (80) between the claws (46) arranged at the oppositely located longitudinal sides (44) of the holder (16), in which space (80) the carrying rails (12), when released, automatically attain their operating position and are fixed in the holder (16) together with the wiping strip (20) by the resulting compression of the longitudinal web (36).

* * * * *